Feb. 1, 1927.

E. F. WAGNER 1,615,893

WOOD SHAPER

Filed Aug. 16, 1926   2 Sheets-Sheet 1

INVENTOR
EDWARD F. WAGNER
BY
ATTORNEY

Feb. 1, 1927.
E. F. WAGNER
1,615,893
WOOD SHAPER
Filed Aug. 16, 1926    2 Sheets-Sheet 2
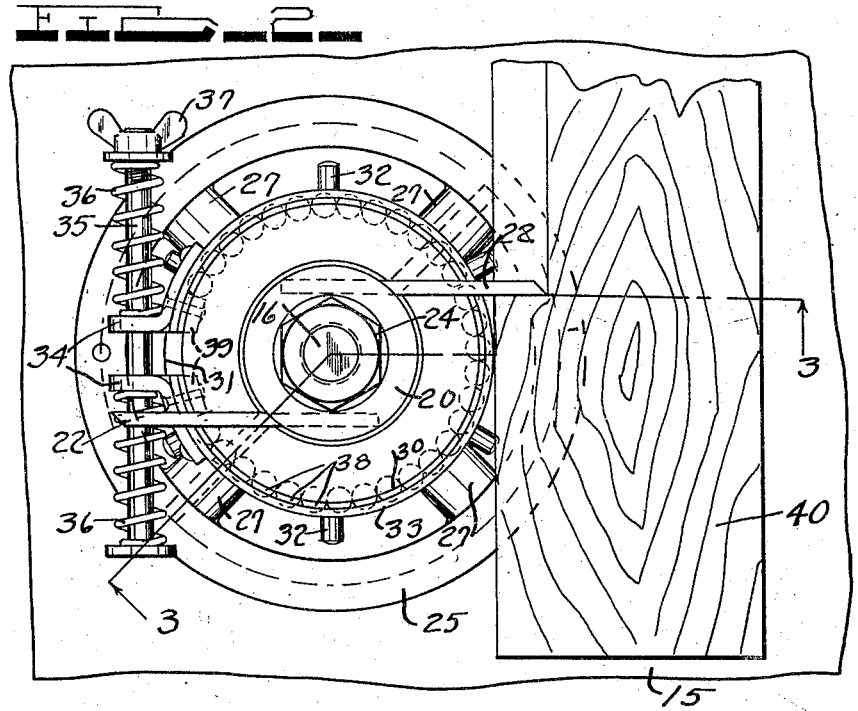
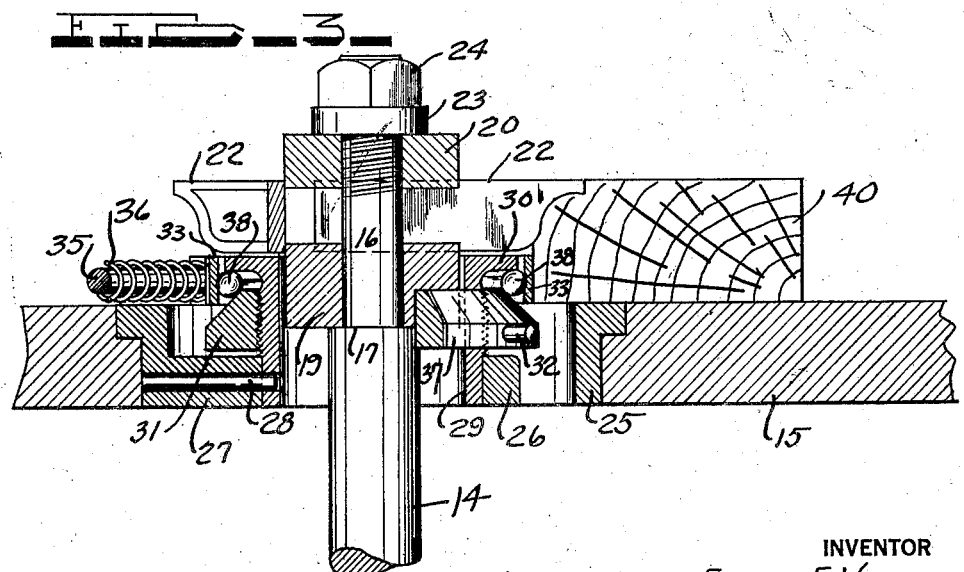
INVENTOR
EDWARD F. WAGNER
BY
ATTORNEY Patented Feb. 1, 1927.

1,615,893

UNITED STATES PATENT OFFICE.

EDWARD F. WAGNER, OF SOUTH BEND, INDIANA, ASSIGNOR TO THE STUDEBAKER CORPORATION, OF SOUTH BEND, INDIANA, A CORPORATION OF NEW JERSEY.

WOOD SHAPER.

Application filed August 16, 1926. Serial No. 129,495.

This invention relates to shaping machines, and particularly to those of the wood-shaping type, the principal object being to provide such machines with stationary work guiding collars to prevent flaws and inaccuracies from occurring in the finished article, which might result from undue vibrations of the rotating cutter tools when the work is guided directly against such tools.

Another object is to provide wood shaping machines with guide collars which are stationary in relation to the rotary spindles and are adjustable to compensate for changes in diameters of the cutter tools from wear or other causes.

Another object is to provide wood shaping machines with work-guiding collars comprising an inner part fixed in the table bed and a tapered cone member threaded on to this part, which cone member may be adjusted to move a series of balls outwardly in order to expand a ring or collar against which the work is guided whereby the same may be positioned to effect the proper relation between the work and the cutter tool.

These being among the objects of the present invention, the same consists of certain features of construction and combinations of parts, to be hereinafter described with reference to the accompanying drawings, and then claimed, having the above and other objects in view.

In the accompanying drawings which illustrate a suitable embodiment of the present invention.

Figure 2 is an enlarged plan view of a portion of the table bed, the work guiding collar, cutters and a partly finished article.

Figure 3 is a section taken on the line 3—3 of Figure 2 more clearly showing the detail parts of the guide collar.

Figure 1:
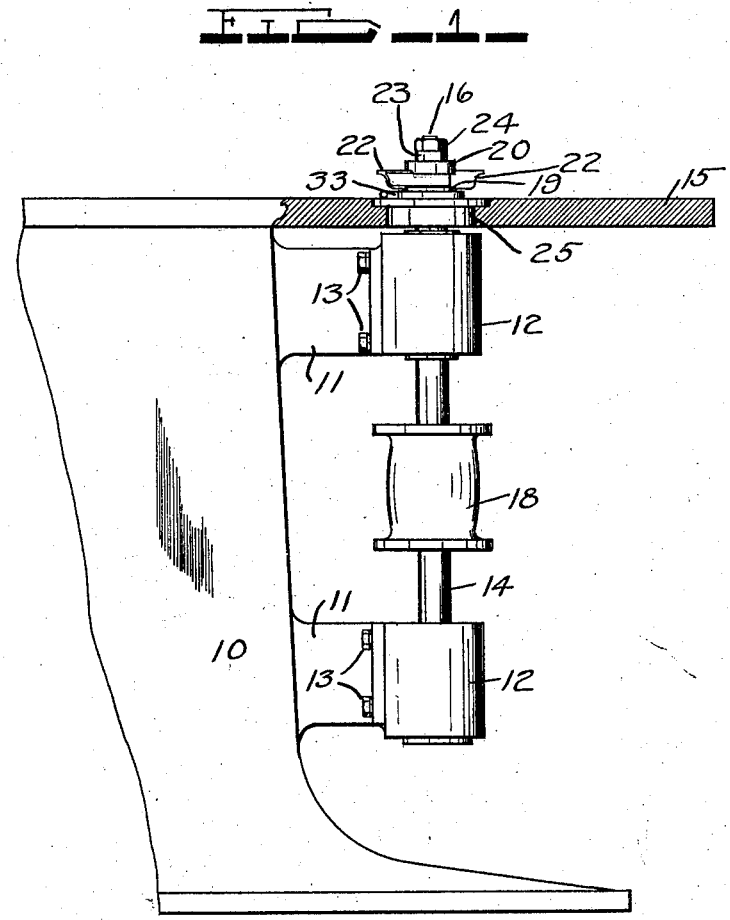
Figure 1 is a partial side view of a wood shaping machine having a portion of the table bed cut away to show the embodiment of this invention.
Figure 4:
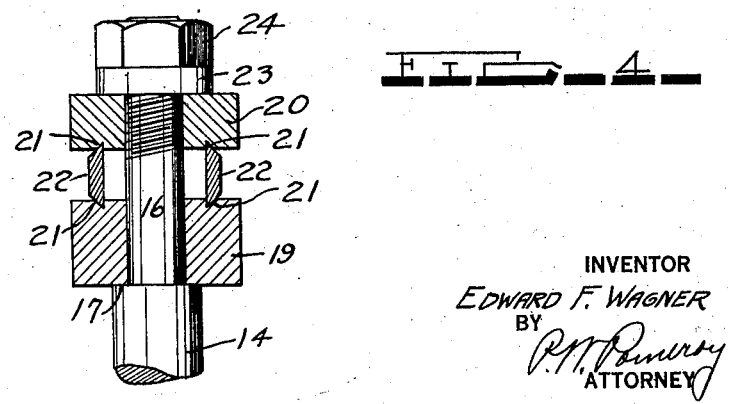
Figure 4 is an enlarged view of the work spindle and cutter blades showing the method of securing the same in position.

Referring now to the accompanying drawings in which like numerals refer to like parts throughout the several views, the wood shaper 10 is provided with brackets 11 to which are attached suitable bearing members 12 by means of the bolts 13. Contained within the bearings 12 and supported by the lower of the same is an upright rotatable spindle 14 which extends somewhat above the table bed 15 and is provided with a threaded bolt end 16 of less diameter, as shown in Figures 3 and 4, the upper end of the spindle 14 providing an annular shoulder 17. A suitable pulley 18 is secured to the spindle 14 between the bearings 12, which spindle 14 is rotated by means of a suitable belt contacting with the pulley 18.

The cutter head comprises a lower collar 19 positioned on the bolt end 16 of the spindle 14 and abutting against the shoulder 17, and a co-operating collar 20 also positioned on the bolt end 16, both of which are provided in their adjacent faces with V-shaped grooves 21 for receiving and retaining suitable cutter knives 22. A washer 23 and a nut 24 threaded on to the bolt end 16 tends to force the upper collar 20 downwardly toward the lower collar 19 to clamp the cutter knives 22 in rigid and fixed position.

Referring particularly to Figures 2 and 3, an annular plate 25 is shown securely held in the table bed 15 and is provided with a hub 26 connected therewith by the integral spokes 27. The hub portion 26 has pinned to its inside face by pins 28 extending through the spokes 27, a cylindrical member 29 which encircles but does not contact with the spindle 14 and collar 19 and extends above the top of the table bed 15 up to a point just below the cutter knives 22, the upper edge thereof being provided with an outwardly extending annular flange 30. Threaded on to the central part of the cylinder 29 is a tapered adjusting ring 31 having a number of projecting lugs 32 to facilitate turning of the same on the cylinder 29. Encircling the flange 30 is a flat band 33 the free ends of which are provided with ears 34, through which a bolt 35 extends, coil springs 36 being placed between each ear 34 and the ends of the bolt 35, the one end being provided with a thumb nut 37 threaded thereonto. Resting on the tapered surface of the adjusting ring 31 are a series of balls 38 which also bear against the under surface of the flange 30 and partly seat in a groove in the flat band 33. Stops 39 positioned at the free ends of the band 33 prevent the balls 38 from becoming displaced.

The band 33 as shown in Figures 2 and 3 provides the work guiding collar mentioned in the objects of the invention and a partly finished wooden article 40 is shown as being guided by this collar and having an edge thereof being rounded by the cutter knives 22 which extend outwardly past the edge of the band 33.

The bearings 12 may become worn and allow the spindle 14 and therefore the cutter head to vibrate, which, in case the work guiding collar was not provided, would cause the surface of an article being finished to be uneven and ragged, and the work would be difficult to hold. With the work being guided by such a collar, evenly finished work can be obtained easily.

The continued use of knife blades causes them to wear down thereby causing a change in the distance from the edge of the band to the cutting edges of the blades. As mentioned in the objects of the invention the band or guide collar can be adjusted to obtain the proper proportion between the work and the cutter blades. To increase the diameter of the work guiding band 33, the thumb nut 37 may be loosened to decrease the tension in the springs 36 and the tapered ring 31 is screwed upwardly on the cylinder 29, the tapered portion causing the balls 38 to expand the band 33. After the band 33 is expanded the proper amount, the thumb nut 37 may be screwed down to clamp the band 33 in proper position against the balls 38.

From the foregoing description, it can be seen that the work guiding collar, in addition to providing a satisfactory guide for the work being finished provides an easily operatable means for obtaining the correct proportion between the work and edges of the cutter tools.

Formal changes may be made in the specific embodiment of the invention described without departing from the spirit and substance of the broad invention the scope of which is commensurate with the appended claims.

What I claim is:—

1. Work guiding means for a wood shaper comprising an axially fixed split ring, an axially movable cone, and means co-operating with both said ring and said cone for regulating the diameter of said ring by axial movement of said cone.

2. Work guiding means for a wood shaper comprising an axially fixed expansible collar, a cone member arranged concentrically therewith, slidable means between said collar and said cone member, and means for varying the axial position of said cone member whereby said slidable means is caused to move radially in respect to said collar and said cone member to control the diameter of said collar.

3. Work guiding means for a wood shaper, comprising a fixed abutment, an inclined plane movable relative thereto, a radially adjustable abutment, and slidable means confined between said abutments and said inclined plane whereby said radially adjustable abutment may be adjusted upon movement of said inclined plane axially thereto.

4. Work guiding means for a wood shaper comprising an expansible collar, a cone concentrically arranged within said collar, an abutment, and slidable members confined between said collar, cone and abutment, said cone being axially adjustable whereby to control the radial position of said slidable members and said collar in respect thereto.

5. In a wood shaper, a cutter spindle provided with a cutter, a supporting collar surrounding said spindle and provided with an end abutment, a cone supported on said collar for axial movement, an axially stationary expansible collar concentrically arranged in respect to said cone, and slidable members arranged between said cone, abutment and expansible collar.

6. In a wood shaper, a cutter spindle provided with a cutter, a supporting collar under said cutter terminating in an abutment adjacent said collar, an axially adjustable cone supported by said collar, a split band ring concentrically arranged in respect to said cone and positioned adjacent said cutter and providing work guiding means, ball-bearings confined between said cone, abutment and ring, and resilient means co-operating with the free ends of said ring tending to contract said ring.

7. In a wood shaper, a cutter spindle provided with a cutter, a fixed collar encircling said spindle and terminating in an outwardly extending abutment-flange adjacent said cutter, a ring provided with a conical face adjustably mounted for axial movement on said collar, a splitband work guide encircling said collar between said abutment-flange and said ring and provided with spring means for drawing the free ends thereof towards each other, a race-way on the inner face of said band, ball-bearings seated in said race-way and contacting with said abutment-flange and said conical face, and means for causing axial movement of said ring and for varying the tension of said spring means.

Signed by me at South Bend, Indiana, U. S. A., this 14th day of August, 1926.

EDWARD F. WAGNER.